(12) United States Patent
Bibi (10) Patent No.: US 7,210,378 B1
(45) Date of Patent: May 1, 2007

(54) CHAIN PLIERS WITH WIRE STRIPPER

(76) Inventor: Lawrence Bibi, Checkolite International, Inc., 142 Charles St., Jersey City, NJ (US) 07307

( * ) Notice: Subject to any disclaimer, the term of this patent is extended or adjusted under 35 U.S.C. 154(b) by 0 days.

(21) Appl. No.: 11/491,806

(22) Filed: Jul. 24, 2006

(51) Int. Cl.
*H02G 1/12* (2006.01)

(52) U.S. Cl. .......................... 81/9.4; 81/9.41; 81/9.42; 81/9.43; 81/9.44

(58) Field of Classification Search .................. 81/9.4, 81/9.41, 9.42, 9.43, 9.44
See application file for complete search history.

(56) References Cited

U.S. PATENT DOCUMENTS

| | | | | |
|---|---|---|---|---|
| 2,889,728 A | * | 6/1959 | Hindenburg | ................ 81/9.42 |
| 3,487,524 A | * | 1/1970 | Filia | ........................... 29/750 |
| 4,381,661 A | * | 5/1983 | Wiener et al. | ........... 72/409.12 |

* cited by examiner

*Primary Examiner*—Lee D. Wilson
*Assistant Examiner*—Shantese McDonald (74) *Attorney, Agent, or Firm*—Ezra Sutton, Esq.

(57) ABSTRACT

A multi-function pliers for installing various hanging light fixtures and electrical connections needed for the installation of the hanging light fixtures. The multi-function pliers includes a pivot pin member; first and second movable jaw members rotatably mounted about the pivot pin member; and a pair of first and second movable handles detachably connected to the first and second movable jaw members, respectively, for pivotal movement of the first and second handles relative to the pivot pin member. Each of the first and second movable jaw members includes an interior side wall and an exterior side wall. Each of the interior side walls includes a recess aperture therein; each of the recess apertures are for detachably receiving a wire cutter member therein; and the wire cutter members cooperate to form a wire cutter assembly. Each of the wire cutter members includes a plurality of different sized cutters, respectively, for cutting and stripping electrical wire. Each of the interior side walls further includes a crimping section having a plurality of crimping apertures thereon for closing and crimping a chain link; and the crimping sections cooperate to form a crimping assembly. Each of the exterior side walls includes a spreader member having a plurality of spreader apertures thereon for spreading apart and opening a chain link; and the spreader members cooperate to form a spreader assembly.

18 Claims, 9 Drawing Sheets

CHAIN PLIERS WITH WIRE STRIPPER

FIELD OF THE INVENTION

The present invention relates to a combination chain pliers having a wire cutter assembly, a chain spreader assembly and a chain crimping assembly. More particularly, this combination chain pliers is especially useful for installing various hanging light fixtures and electrical connections needed for hanging light fixtures.

BACKGROUND OF THE INVENTION

Pliers having a single function, such as retaining ring pliers, snap ring pliers, crimping pliers, ring expander pliers, wire cutting pliers and the like are well-known in the prior art. The above-mentioned tools have a limited capacity for only that function, such that for a given project or task many tools, pliers, and cutters are needed to complete the work required for a given installation, such as the installation of a hanging light fixture. For example, to install a chandelier the installer would need three or four different types of pliers, wire cutters and/or crimpers to install the hanging light fixture. The installer would like to have a tool that is capable of multiple functions for any given installation.

There remains a need for a combination pliers that has the capacity for wire cutting in order to cut and strip electrical wire allowing the user to install electrical connections needed when hanging a particular type of lighting fixture being worked on. Also, this combination pliers would have the capacity to spread and pull open an individual chain link of a chain link assembly, as swell as have the capacity to close and crimp a single chain link for reassembling the chain link assembly of the chandelier being installed.

DESCRIPTION OF THE PRIOR ART

Pliers having various functions, designs, configurations, structures and materials of construction have been generally disclosed in the prior art. For example, U.S. Pat. No. 4,625,595 to HSIAO discloses a wire stripper comprising a pair of symmetric arms pivotally connected together. A pair of supporting pieces is respectively secured to the arms. A stationary cutting member is being secured to one of the supporting pieces. Also, a pivotal cutting member is pivotally attached thereto cooperating with the stationary cutting member and serves as a stripper. A stationary clamping member is secured to the other supporting piece. A pivotal clamping member is pivotally connected thereto, is associated with the stationary clamping member and serves as a clamp. In use, electrical wire can be fixedly clamped by the clamp and the coating of the electric wire can be simultaneously stripped off by the stripping action. Thus, this wire stripper can complete the stripping action in one single operation. This prior art patent does not disclose or teach the concept of a combination chain pliers tools having the features of a wire cutter, a chain spreader and a chain crimper of the present invention.

U.S. Pat. No. 4,280,625 to MURPHY discloses retaining ring pliers having coplanar jaws independently and movably secured and handles independently and rotatably secured about the pivot. Fulcrum pins are slidably disposed in each of the jaws being equal distance from the pivot. The pins may alternately engage the first handle and first jaw and second handle and second jaw and be reversed so that the first handle engages the second jaw and the second handle engages the first jaw. This prior art patent does not disclose or teach the concept of a combination chain pliers tool having the features of a wire cutter, a chain spreader and a chain crimper of the present invention.

U.S. Pat. No. 6,983,677 to ENGEL discloses convertible retaining ring pliers having a pivot, first and second jaws and first and second handles rotatably secured about the pivot. A pair of transfer pins is slidably disposed for selective movement in the first and second jaws and the first and second handles for establishing alternative operating positions. This enables the jaws to move inwardly as the handles move inwardly and allows the jaws to move outwardly as the handles move inwardly. A switching mechanism is mounted to the handles and pivot for providing simultaneous shifting of the transfer pins in the jaws of the handles. The switching mechanism includes first and second flexing spring plates which are mounted on opposite ends of the pivot and disposed on opposite external surfaces of the handles. Each of the spring plates includes a pair of boss pins engageable with opposite ends of the transfer pins. In each operating position one pair of corresponding boss pins on the first and second spring plates lies raised above the external surfaces of the handles, and another pair of corresponding boss pins lies recessed in the first and second handles. This prior art patent does not disclose or teach the concept of a combination chain pliers tool having the features of a wire cutter, a chain spreader and a chain crimper of the present invention.

None of the aforementioned prior art patents teach or disclose the design, configuration and structure of a combined tool having a wire cutting assembly, a chain spreader assembly and a chain crimper assembly for forming a chain pliers for use in the installation of various hanging light fixtures and electrical connections needed for the hanging light fixtures.

Accordingly, it is an object of the present invention to provide a combination chain pliers that includes a wire cutter assembly, a spreader assembly and a crimping assembly for installing various lighting fixtures and electrical connections for the various lighting fixtures, such as a chain link chandelier.

Another object of the present invention is to provide a combination chain pliers having a wire cutter assembly for cutting and stripping of electrical wire in order to install electrical connections needed when hanging a lighting fixture being worked on.

Another object of the present invention is to provide a combination chain pliers having a spreader assembly for opening and expanding an individual chain link of a chain link assembly of a hanging lighting fixture.

Another object of the present invention is to provide a combination chain pliers having a crimping assembly for closing and crimping of an opened single chain link of a chain link assembly of a hanging lighting fixture.

Another object of the present invention is to provide a combination chain pliers that is long-lasting, durable and easy to use and manipulate.

A further object of the present invention is to provide a combination chain pliers that can be mass-produced in an automated and economical manner and is readily affordable to the electrician or consumer.

SUMMARY OF THE INVENTION

In accordance with the present invention, there is provided a multi-function pliers for installing various hanging light fixtures and electrical connections needed for the installation of hanging light fixtures. The multi-function pliers includes a pivot pin member; a pair of first and second movable jaw members rotatably mounted about the pivot pin member; and a pair of first and second movable handles detachably connected to the first and second movable jaw members, respectively, for pivotal movement of the first and second handles relative to the pivot pin member.

Each of the first and second movable jaw members includes an interior side wall and an exterior side wall. Each of the interior side walls includes a recess aperture therein; each of the recess apertures are for detachably receiving a wire cutter member therein; and the wire cutter members cooperate to form a wire cutter assembly. Each of the wire cutter members includes a plurality of different sized cutters, respectively, for cutting and stripping electrical wire.

Each of the interior side walls further includes a crimping section having a plurality of crimping apertures thereon for closing and crimping a chain link; and the crimping sections cooperate to form a crimping assembly. Each of the exterior side walls includes a spreader member having a plurality of spreader apertures thereon for spreading apart and opening a chain link; and the spreader members cooperate to form a spreader assembly.

BRIEF DESCRIPTION OF THE DRAWINGS

Further objects, features and advantages of the present invention will become apparent upon the consideration of the following detailed description of the presently-preferred embodiment when taken in conjunction with the accompanying drawings, wherein.

DETAILED DESCRIPTION OF THE PREFERRED EMBODIMENT

Figure 7:
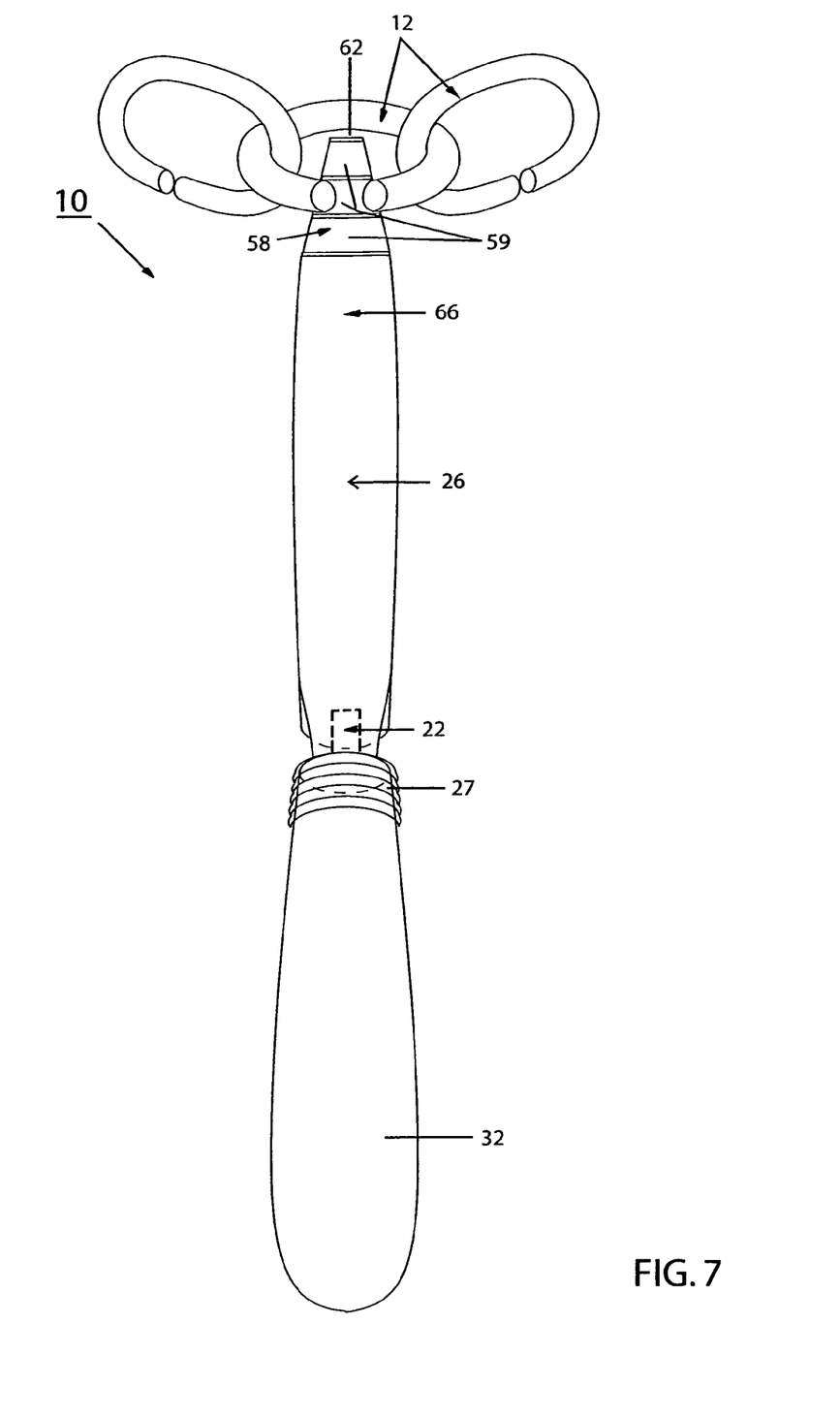
FIG. 7 is a side elevational view of the chain pliers of the present invention showing the spreader member in an operational mode for opening and expanding the individual chain link.
Figure 8:
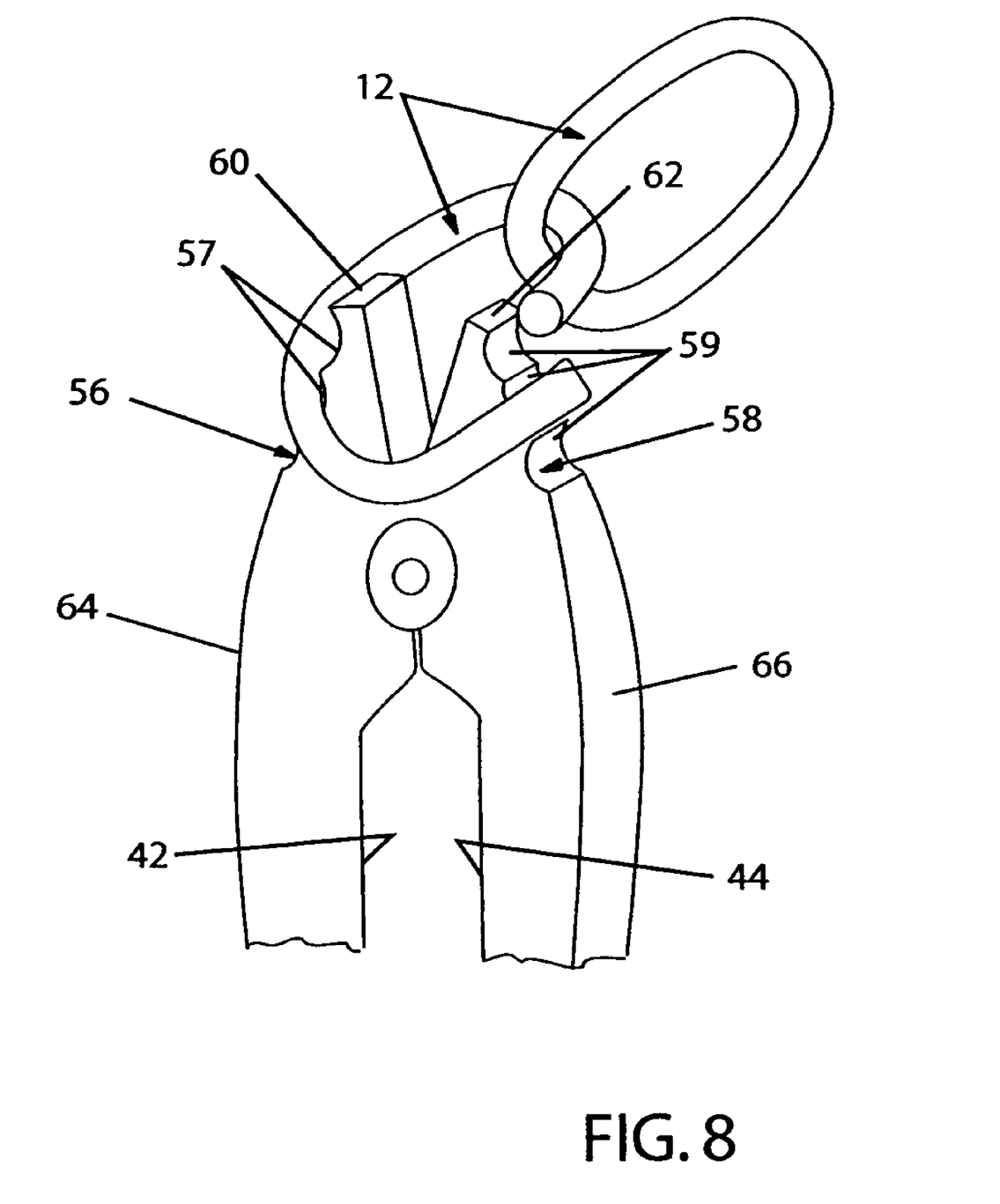
FIG. 8 is a partial perspective view of the chain pliers of the present invention showing each of the spreader members in an operational mode for opening and expanding the chain link.

The chain pliers 10 with a wire stripper assembly 50 and its component parts of the present invention are represented in detail by FIGS. 1 through 9 of the drawings. The chain pliers 10 with a wire stripper assembly 50 is used to open and close chain links 12 for hanging chandeliers 13, as well as cut and strip electrical wire 14 for providing electrical connections needed when hanging the lighting fixtures being worked on. Chain pliers 10 is also used as a ring expander tool for opening and expanding a single chain link 12, as shown in FIGS. 7 and 8 of the drawings.

Figure 1:
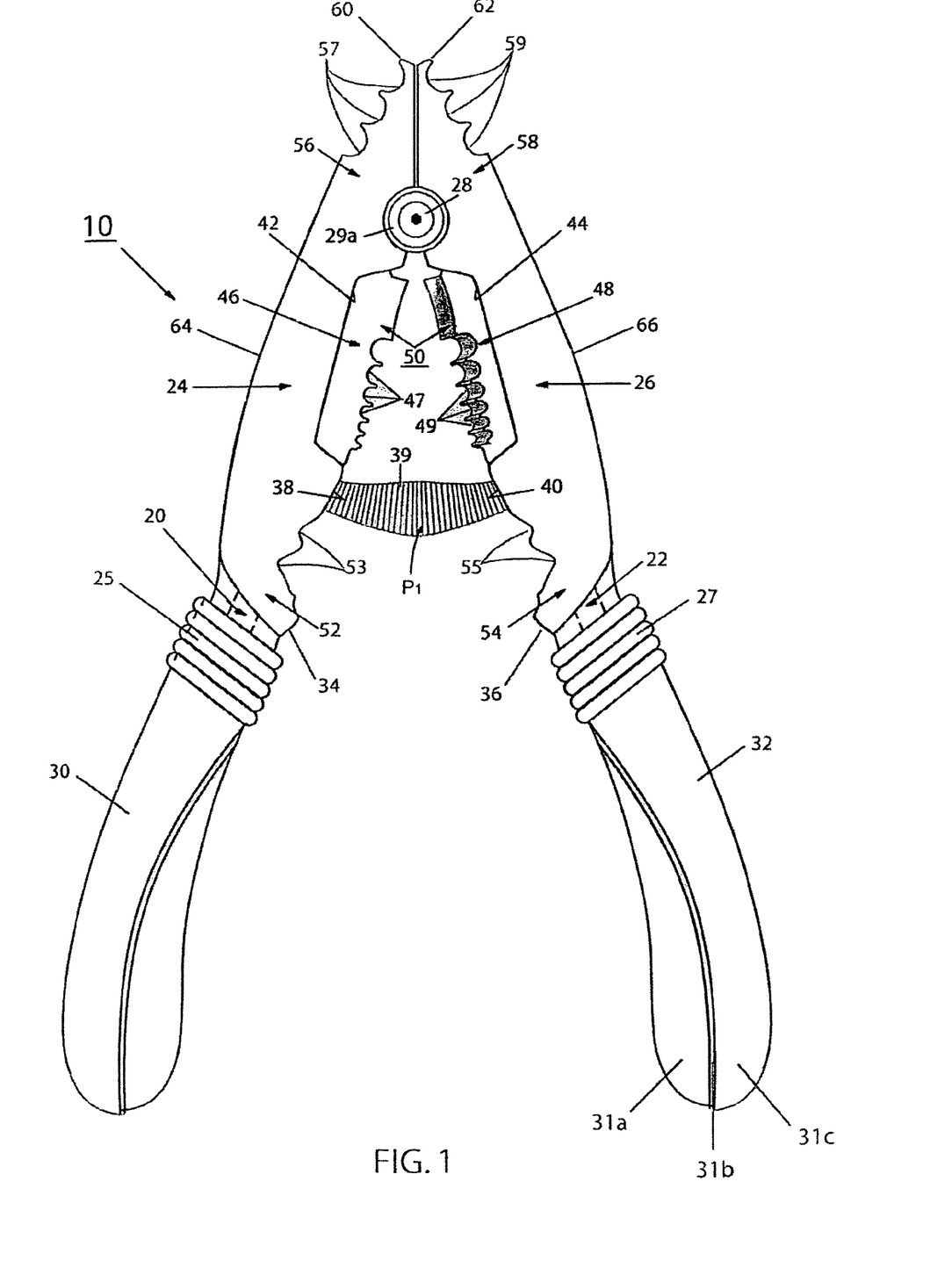
FIG. 1 is a perspective view of the chain pliers of the present invention of the preferred embodiment showing the major component parts and the pliers being in the open configuration.
Figure 2:
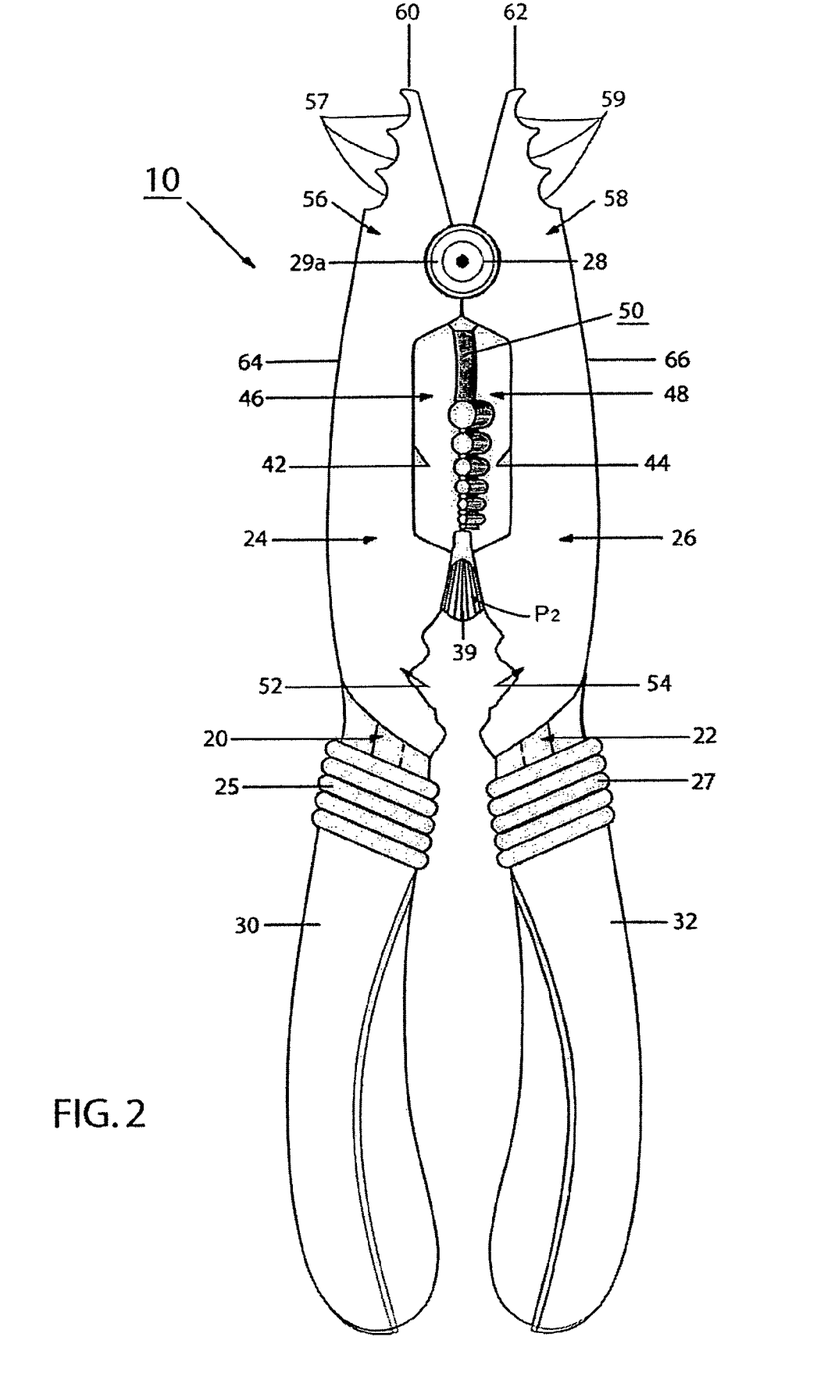
FIG. 2 is a perspective view of the chain pliers of the present invention showing the major component parts and the pliers being in the closed configuration.
Figure 3:
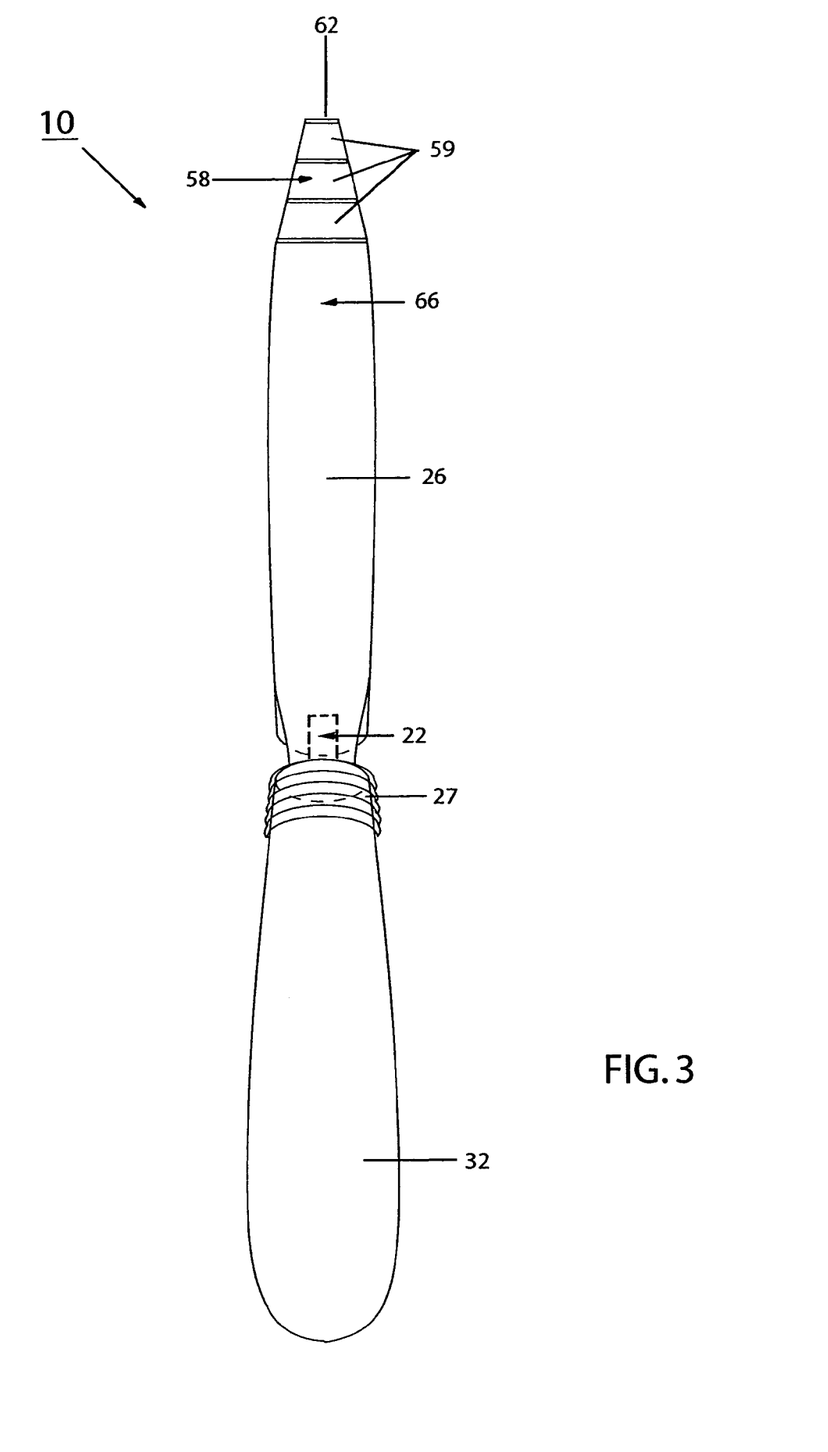
FIG. 3 is a slide elevational view of the chain pliers of the present invention showing one of the spreader members at the distal end of a moveable jaw and a handle grip.
Figure 4:
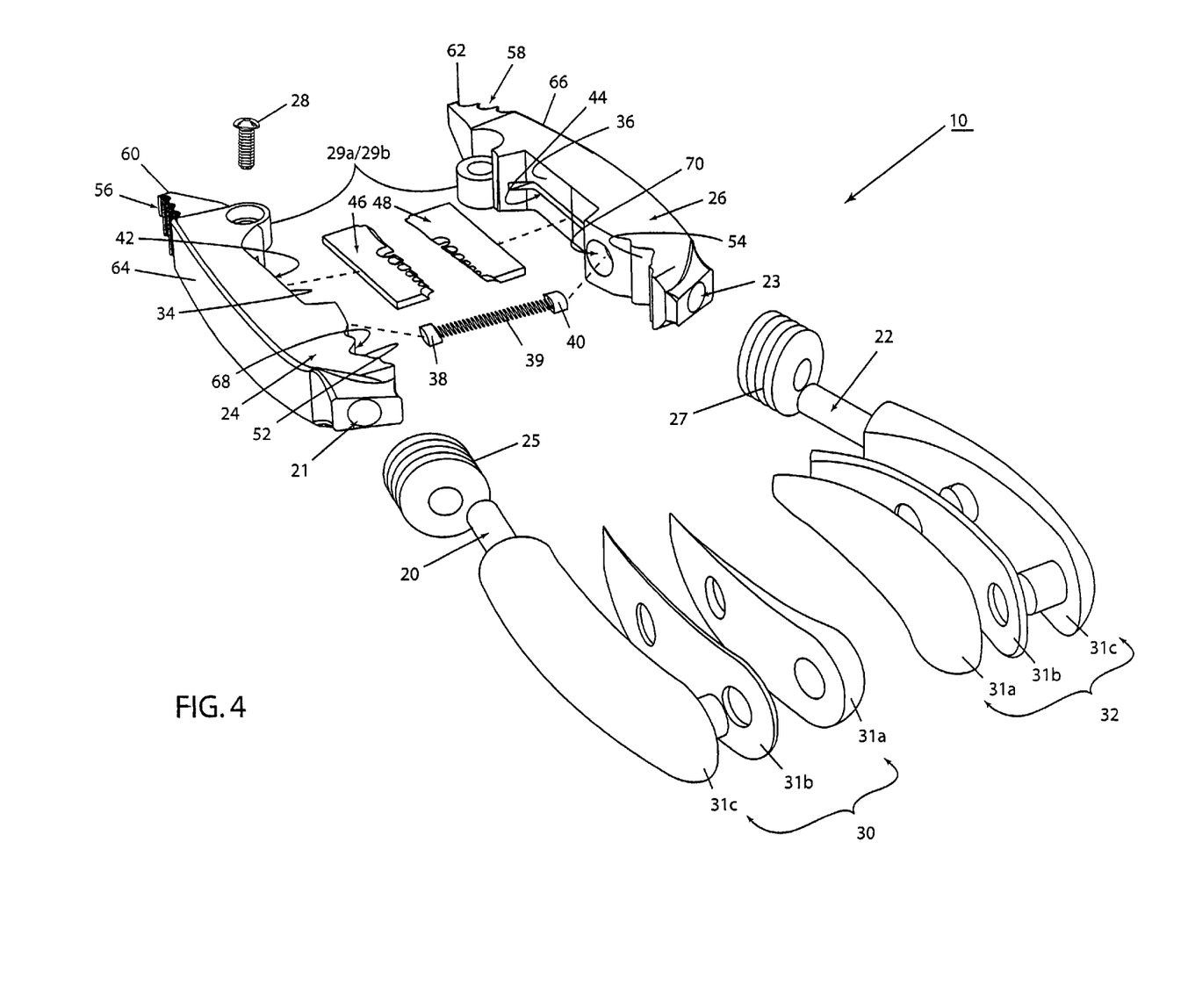
FIG. 4 is an exploded perspective view of the chain pliers of the present invention showing the major component parts thereof.

The chain pliers 10, as shown in FIGS. 1, 2 and 4, includes a pair of handles 20 and 22, a pair of elongated movable jaws 24 and 26, and a pivot pin member 28. The movable jaws 24 and 26 are arranged to have pivotal movement about the pivot pin member 28. As shown in FIG. 4, the pivot pin member 28 is received within upper and lower pivot pin holding members 29a and 29b, respectively. Additionally, each of the movable jaws 24 and 26 further include a handle opening 21 and 23 for receiving each of the handle (sections) 20 and 22, respectively, as shown in FIG. 4. The handles 20 and 22 include a grip member assembly 30 and 32 that provide coverings for each of the handles 20 and 22 for increased gripping by the user. Further, each of the handle members 20 and 22 includes a handle covering 25 and 27, respectively, as depicted in FIGS. 1 and 4. As shown in FIGS. 1 and 4, each grip member assembly 30 and 32 includes an interior grip member 31a, an intermediate grip member 31b, and an exterior grip member 31c for forming each of the grip member assemblies 30 and 32, respectively. Grip member assemblies 30 and 32 are made from synthetic rubber, natural rubber or pliable plastic materials. Each of the movable jaws 24 and 26 include an interior side wall 34 and 36. Each interior side wall 34 and 36 includes a spring attachment connector 38 and 40 for attaching a spring 39 thereto. Each of the spring attachment connectors 38 and 40 are received within each of the connector openings 68 and 70, respectively, as depicted in FIG. 4. Each of the interior side walls 34 and 36 also include an offset recess aperture 42 and 44 each for receiving a wire cutter member 46 and 48 therein. Each wire cutter member 46 and 48 includes a plurality of different sized semi-circular cutters 47 and 49, respectively, for cutting and stripping of plastic-coated electrical wire 14. Each of the wire cutter members 46 and 48 form a wire stripper assembly 50 for stripping the outer insulation covering 15 of the electrical wire 14, as depicted in FIG. 5.

Figure 5:
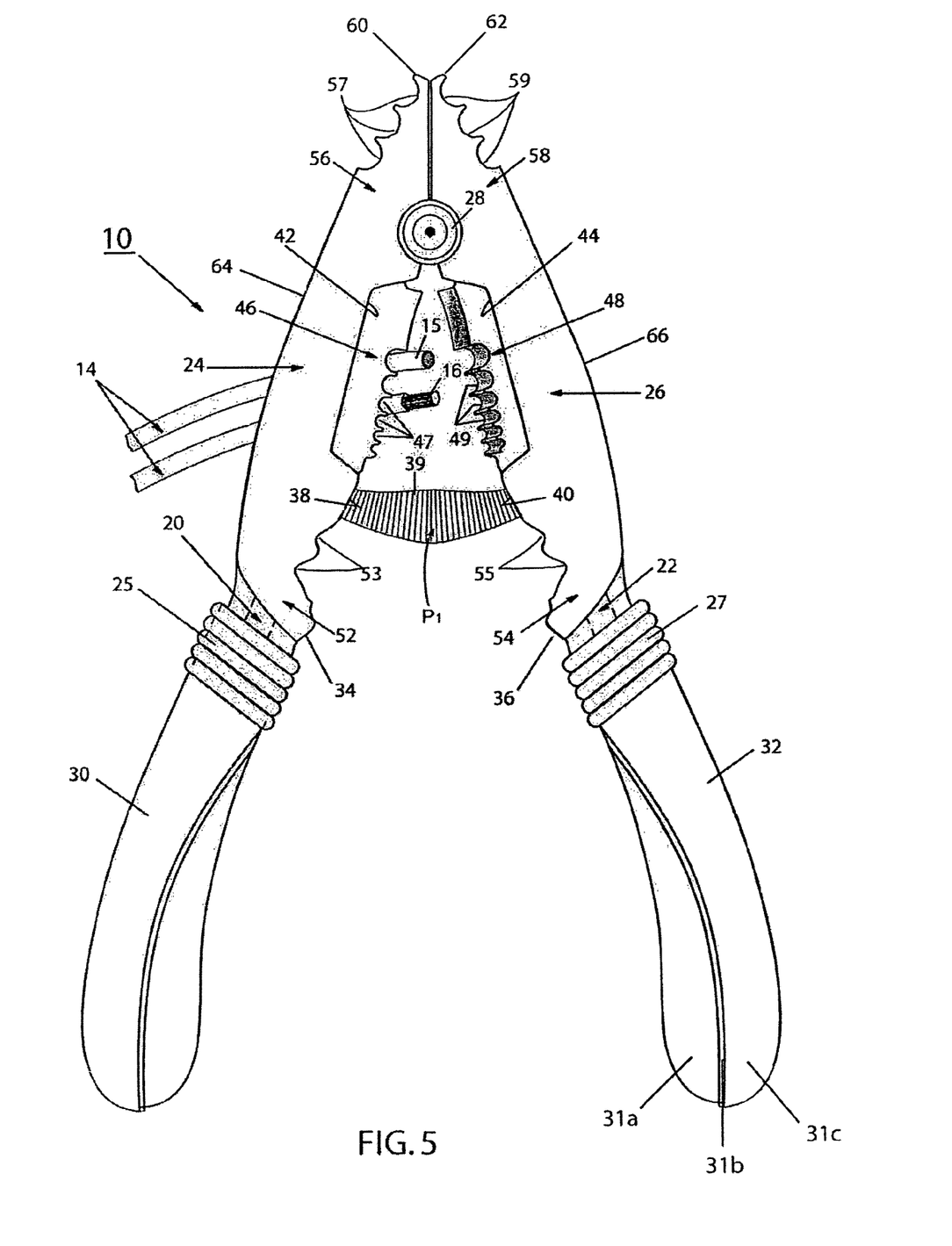
FIG. 5 is a perspective view of the chain pliers of the present invention showing a wire cutter assembly in an operational mode for cutting and stripping of electrical wires being in the open configuration.
Figure 6:
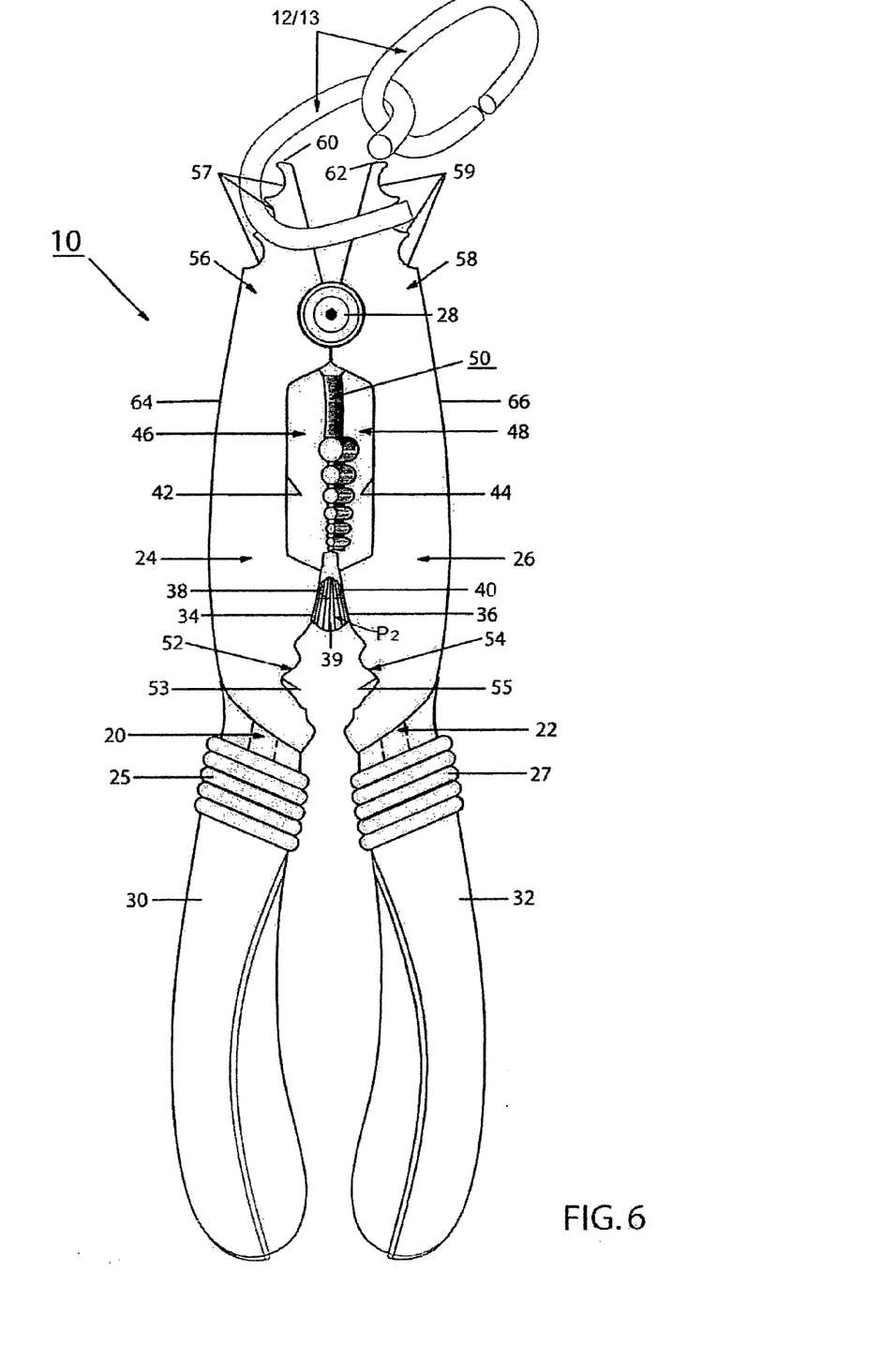
FIG. 6 is a perspective view of the chain pliers of the present invention showing a pair of spreader members in an operational mode for opening and expanding an individual chain link being in the closed configuration.
Figure 9:
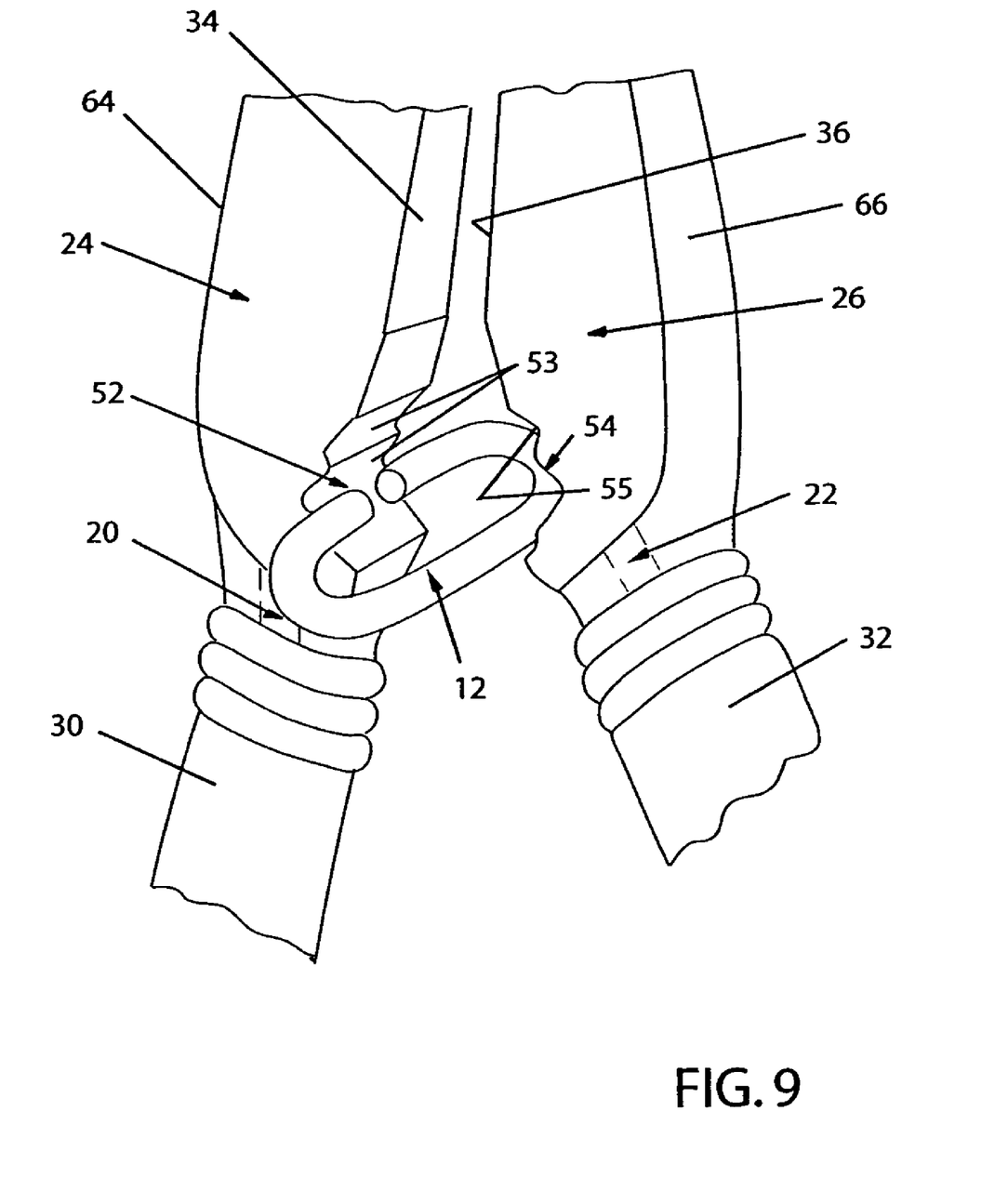
FIG. 9 is a partial perspective view of the chain pliers of the present invention showing a pair of crimping members in an operational mode for closing and crimping the individual chain link.

The spring 39 is movable from an open position $P_1$ in order to spread apart each of the wire cutter members 46 and 48 for inserting an insulated coated electrical wire 14 into one of the matching semi-circular cutters 47 and 49 where then the spring 39 is movable to a closed compressed position $P_2$ in order to close each of the wire cutter members 46 and 48, for cutting and stripping of the insulation coating 15 of electrical wire 14 leaving a short section of exposed wire 16 from the matching semi-circular cutters 47 and 49 of the wire cutter members 46 and 48, respectively, on the wire cutter assembly 50, as shown in FIG. 5 of the drawings. Each of the interior side walls 34 and 36 further include a crimping section 52 and 54 each having a plurality of crimping apertures 53 and 55 thereon for closing and crimping an individual chain link 12, as shown in FIG. 9 of the drawings. As shown in FIGS. 1, 2 and 4, each of the movable jaws 24 and 26 includes a spreader member 56 and 58 positioned on exterior side walls 64 and 66, respectively, of pliers 10. Each of the spreader members 56 and 58 include a plurality of spreader apertures 57 and 59, respectively, for spreading apart and opening a chain link 12, as depicted in FIGS. 7 and 8 of the drawings. The spreader apertures 57 and 59 of spreader members 56 and 58 on movable jaw 24 and 26, respectively, are positioned on the distal ends 60 and 62 of movable jaws 24 and 26, accordingly. Movable jaws 24 and 26 are made from lightweight metal materials, such as aluminum, steel, stainless steel, titanium, and the like.

OPERATION OF THE PRESENT INVENTION

During operational use, as shown in FIGS. 5 through 9, the installer/user operates the chain pliers in the following manner: In the electrical wire cutting process, the user simply places an electrical wire 15 within one of the matching semi-circular cutters 47 and 49 of wire cutter member 46 and 48, such that the wire cutter assembly 50 strips the outer insulation covering 15 of the electrical wire 14 leaving a short section of exposed wire 16, as depicted in FIG. 5 of the drawings. In the chain link expanding/opening process, the user places and positions an individual chain link 12 on each of the spreader apertures 57 and 59 at the distal ends 60 and 62 of spreader members 56 and 58, such that the spreader assembly 55 spreads apart and opens that individual (single) chain link 12, as shown in FIGS. 7 and 8 of the drawings. In the chain link crimping process, the user places and positions the individual (single) chain link 12 on each of the crimping apertures 53 and 55 of crimping sections 52 and 54, such that the crimping assembly 51 closes and crimps that single chain link 12 to the closed position, as shown in FIG. 9 of the drawings.

ADVANTAGES OF THE PRESENT INVENTION

Accordingly, an advantage of the present invention is that it provides for a combination chain pliers that includes a wire cutter assembly, a spreader assembly and a crimping assembly for installing various lighting fixtures and electrical connection for the various lighting fixtures, such as a chain link chandelier Another advantage of the present invention is that it provides for a combination chain pliers having a wire cutter assembly for cutting and stripping of electrical wire in order to install electrical connections needed when hanging a lighting fixture being worked on.

Another advantage of the present invention is that it provides for a combination chain pliers having a spreader assembly for opening and expanding an individual chain link of a chain link assembly of a hanging lighting fixture.

Another advantage of the present invention is that it provides for a combination chain pliers having a crimping assembly for closing and crimping of an opened single chain link of a chain link assembly of a hanging lighting fixture.

Another advantage of the present invention is that it provides for a combination chain pliers that is long-lasting, durable and easy to use and manipulate.

A further advantage of the present invention is that it provides for a combination chain pliers that can be mass-produced in an automated and economical manner and is readily affordable to the electrician or consumer.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:
1. A multi-function pliers, comprising:
a) a pivot pin member;
b) first and second movable jaw members being rotatably mounted about said pivot pin member;
c) first and second movable handles being detachably connected to said first and second movable jaw members, respectively, for pivotal movement of said first and second handles relative to said pivot pin member;
d) each of said first and second movable jaw members includes an interior side wall and an exterior side wall;
e) each of said interior side walls includes a recess aperture therein; each of said recess apertures for detachably receiving a wire cutter member therein; and said wire cutter members cooperating to form a wire cutter assembly;
f) each of said wire cutter members includes a plurality of different sized cutters, respectively, for cutting and stripping electrical wire;
g) each of said interior side walls further includes a crimping section having a plurality of crimping apertures thereon for closing and crimping a chain link; and said crimping sections cooperating to form a crimping assembly; and
h) each of said exterior side walls includes a spreader member having a plurality of spreader apertures thereon for spreading apart and opening a chain link; and said spreader members cooperating to form a spreader assembly.

2. A multi-function pliers in accordance with claim 1, wherein each of said first and second movable jaw members includes a proximal end and a distal end; wherein said distal ends have said spreader assembly mounted thereon.

3. A multi-function pliers in accordance with claim 2, wherein said crimping assembly is adjacent to said proximal ends of said first and second movable jaw members.

4. A multi-function pliers in accordance with claim 1, wherein said wire cutter assembly is between said spreader assembly and said crimping assembly.

5. A multi-function pliers in accordance with claim 1, wherein said pivot pin member is between said spreader assembly and said wire cutter assembly.

6. A multi-function pliers in accordance with claim 1, wherein the movement of said first and second handles towards each other moves said spreader members from a closed position to an open position for performing a spreading process.

7. A multi-function pliers in accordance with claim 1, wherein said movement of said first and second handles towards each other moves said wire cutter members from a spaced-apart open position to a closed compressed position for performing a wire cutting process.

8. A multi-function pliers in accordance with claim 1, wherein said movement of said first and second handles towards each other moves said crimping members from a spaced-apart open position to a closed position for performing a crimping process.

9. A multi-function pliers in accordance with claim 1, further includes a spring member being connected to each of said interior side walls of said first and second movable jaw members.

10. A multi-function pliers in accordance with claim 9, wherein said spring member is connected between said wire cutter members and said crimping members.

11. A multi-function pliers in accordance with claim 9, wherein each of said interior side walls includes a connector opening for receiving a spring attachment connector therein of said spring member.

12. A multi-function pliers in accordance with claim 9, wherein said spring member is movable from an open expanded position in order to spread apart each of said wire cutter members for inserting a covered electrical wire into one of said matching cutters to a closed compressed position in order to close each of said wire cutter members for cutting and stripping of the covered electrical wire leaving a short section of exposed wire extending from said matching cutters of said wire cutter members of said wire cutter assembly.

13. A multi-function pliers in accordance with claim 1, wherein each of said handles includes a cylindrical-shaped rod handle section.

14. A multi-function pliers in accordance with claim 13, wherein each of said movable jaw members at said proximal ends includes a handle opening for receiving said rod handle section, respectively, therein.

15. A multi-function pliers in accordance with claim 1, wherein said first and second handles includes a grip member assembly attached thereto.

16. A multi-function pliers in accordance with claim 15, wherein each of said grip member assemblies includes an interior grip member, an intermediate grip member and an exterior grip member on each of said first and second handles for increased gripping by a user.

17. A multi-function pliers in accordance with claim 16, wherein each of said grip member assemblies are made from synthetic rubber, natural rubber or pliable plastic materials.

18. A multi-function pliers in accordance with claim 1, wherein each of said movable jaws are made from lightweight metal materials selected from the group consisting of aluminum, steel, stainless steel and titanium.

\* \* \* \* \*